Sept. 16, 1930.     W. H. SMITH     1,775,700
METHOD OF FORMING HYDROCARBON COMPOUNDS
Filed Oct. 28, 1926
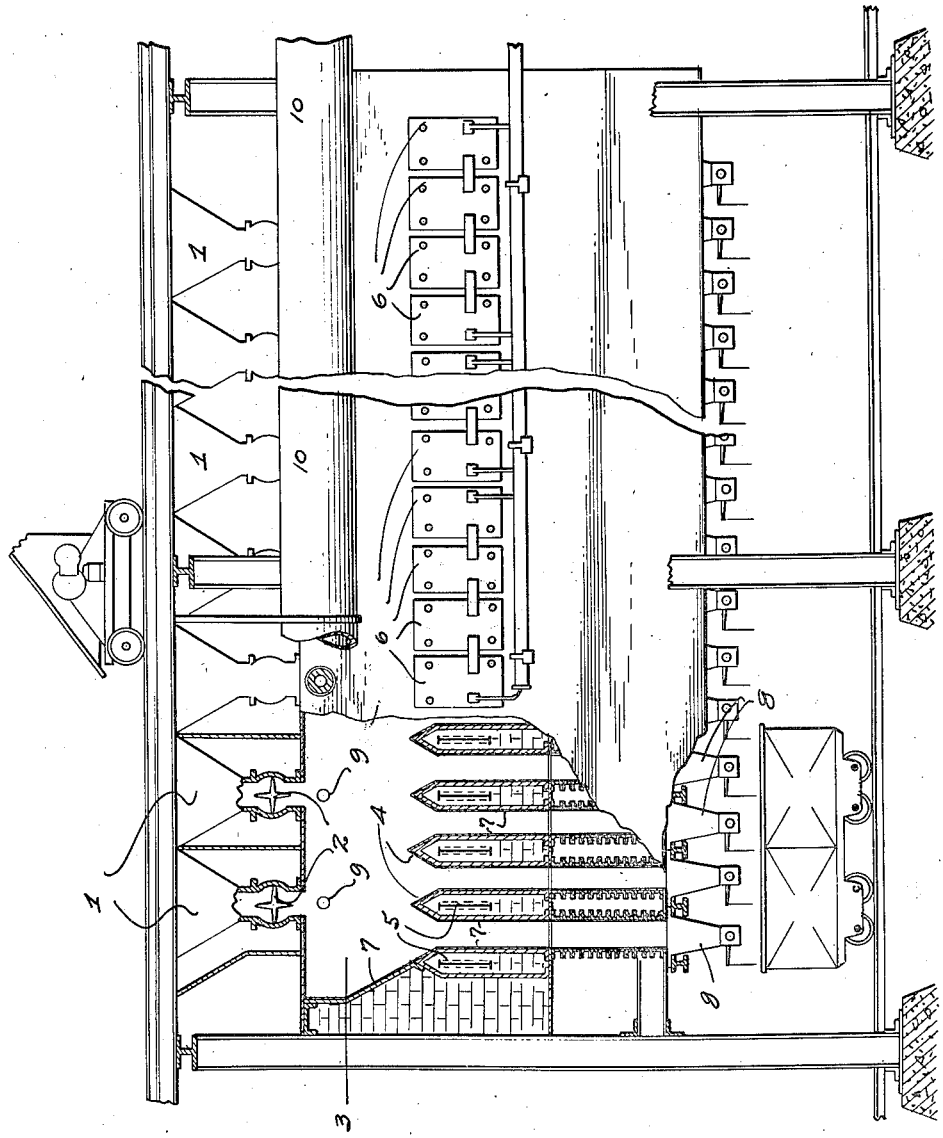
Inventor.
William H. Smith
By
Stuart C Barnes
Attorney Patented Sept. 16, 1930

1,775,700

UNITED STATES PATENT OFFICE

WILLIAM H. SMITH, OF DETROIT, MICHIGAN

METHOD OF FORMING HYDROCARBON COMPOUNDS

Application filed October 28, 1926. Serial No. 144,761.

This invention relates to a method of forming hydrocarbon compounds and has to do particularly with the production of a fixed gas of high methane ($CH_4$) content in the process of reducing metallic oxides.

In the past in the reducing of iron ores, and particularly in the reducing of iron ore to an iron without melting, it has been the general practice to feed the iron ore and reducing agent into a closed retort and to supply the reducing heat at a specified zone whereby to cause reaction between the ore and the reducing agent to reduce the ore to what is known as sponge iron. This reaction between the ore and reducing agent results in the formation and liberation of certain gases which are valuable as a by-product. Various attempts have been made to increase the efficiency in the reduction of iron ore to sponge iron, and in a prior application I have illustrated and described an ore reducing process and apparatus therefor, which not only effects an efficient reduction of the ore, but which also results in the production of a by-product of gas of high value. However, so far as I am aware, the gases resulting from these metallic oxide reducing processes have shown no appreciable methane content.

It is the object of the present invention to produce a fixed gas of high methane content, or high hydrogen content, or both, in the process of reducing metallic oxides, by the use of a catalytic agent. This catalytic agent may be utilized as a part of the reduction container, or as a separate medium in the reduction chamber. This new process of forming a gas of high methane content is preferably utilized in connection with an ore reducing process wherein the iron ore is fed in a continuous stream and enclosed in a retort whereby the heat of reduction is applied by conduction. The ore used preferably contains some chemical compounds carrying hydrogen such as $H_2O$, $KOH$, $NaOH$, etc., or any of the hydrogen carrying compounds may be added with the reduction materials at suitable temperatures for their reaction. The reducing agent used is preferably charcoal carrying chemical compounds containing hydrogen, or any carbons or hydrocarbons having hydrogen associated therewith. This bringing together of hydrogen or its compounds in the presence of carbon and iron oxide and any suitable catalytic agent results in the formation of a hydrocarbon compound such as methane ($CH_4$). The iron ore in my process is preferably continuously passing therethrough and the continuously passing iron ore on its way to the reducing zone, being the means in conjunction with the catalytic agent of bonding together the liberated carbon and hydrogen to form the fixed hydrocarbon. This process differs materially from other processes where a catalyzer is used, where iron oxide is used as a permanent catalyzer, and is only changed or removed when cleaned.

In the drawings I have illustrated one form of apparatus for accomplishing the production of a fixed gas of a high methane content, this drawing in particular illustrating an electrical furnace for the reduction of iron ore to sponge iron.

The utilization of a metallic oxide reducing process to form a fixed gas of high methane content is shown and described as being an extremely practical and economical way of producing this valuable gas. There are various ways and means whereby this fixed gas of high methane content may be produced other than in connection with a closed retort of a sponge iron reducing furnace, but this production of a fixed gas of high methane content is so particularly adapted to the process of reducing iron ore, or the metallic oxides, that it is described herewith and forms a part of the present invention.

The production of my hydrocarbon or fixed gas of high methane content may be best shown by describing the structure and operation of an iron reducing furnace embodying the invention. The drawing illustrates an electric furnace having at the top thereof a series of hoppers 1 for feeding the iron ore and reducing agent into the reducing retorts. Suitable valves 2 are provided which are preferably gas tight and capable of maintaining a pressure in the reduction chamber, and which also preferably assist in feeding the ore into the reducing ovens. The furnace proper may be of any length desired, in accordance with the production required, and the top part of the oven part of the furnace, which may be generally designated 3, is preferably contiguous whereby the ore, when continuously fed into the furnace, is fed into the top of the furnace as a unitary mass.

This unitary mass is divided up, preferably into columns long and narrow in cross section, by means of the heating elements 4. These heating elements 4 may be of any shape desired, but regardless of the shape they are designed to extend within the mass of ore whereby the temperatures required are created within the mass of ore and to divide such mass of ore into suitable columns or banks. The heating elements shown preferably extend across the furnace and are hollow in the upper portion thereof to receive suitable electric resistance elements 5, but they may be placed at intervals within the mass of ore. The wall of the furnace is provided with suitable covers 6 whereby the resistance elements may be removed and replaced as desired. The walls 7 of the passageways formed by the heating elements are preferably made from a catalytic material or may be coated with a catalytic agent which may be either nickel or chromium, or any other suitable catalyzer. This catalyzing agent may be introduced into the gas producing zone or retort as a separate member, or the walls of the retorts may be completely made from same, or partially coated or plated as desired. The catalytic agent may be added with, or some ores may carry a catalytic agent that will act in presence of H. The retorts formed by the heating elements 4 may contain cooling and preheating means for the ore. But such details need not be here described as they do not form a part of the present invention, the main point here being that the retorts are closed and the heat is supplied within the mass of ore and by conduction.

The bottoms of the retorts are closed by suitable hoppers 8 which permit of delivery of the reduced ore, or sponge iron, as desired. The retorts for receiving and reducing the ore are therefore completely enclosed from bottom to top and as the heat is applied substantially entirely within the general mass of ore, and as such heat is applied by conduction, it will be obvious that certain gases are formed and liberated as the reduction and reaction process take place. Suitable outlet conduits 9 are therefore formed in the ovens or retorts, and these outlets or conduits lead to a suitable main conduit 10 for conveying the gases to a suitable receptacle for subsequent use.

In the operation of my furnace in the production of a fixed gas of high methane content, the ore is fed continuously through the hoppers 1 and through the top part of the main furnace or retort. Together with this ore is fed a certain amount of reducing agent which is preferably charcoal, or any carbon or hydrocarbon having associated therewith a certain amount of hydrogen. The ore used is preferably an ore of a high combined hydrogen content, but this is not necessary as the process can be carried out with ores which have been previously considered as high grade ores because of lack of this hydrogen content.

As the ore, mixed with the reducing agent, is fed toward the heating elements 4, the catalyzer, which may be a nickel or chromium coated wall or other suitable catalyzer, will, in the presence of the continuously moving iron oxide, serve to bind such elements as carbon and hydrogen as they rise from the breaking-up zone so as to form a fixed gas such as methane ($CH_4$) at temperatures of approximately 500° F. The iron oxide, as it passes through the reducing zone, will be reduced whereby it will lose its oxygen and be reduced to sponge iron. In the illustration I have shown the use of electric resistance heating elements for the reason that by means of these resistance elements, the correct amount of reducing heat may be accurately maintained at all times, whereby the low temperatures of reduction used in conjunction with hydrocarbon disassociation may be arrived at and maintained in contrast with the other heating means whereby initially high temperatures are arrived at which must be reduced for efficient results. This arriving at and maintaining of only the required amount of reducing temperature may have an important bearing on production of the methane gas, but regardless of this, it does have an efficient relation to the correct reduction of the iron ore to sponge iron. As the iron oxide continuously passes through the retorts and a fresh supply is always presented, it will be obvious that no problem will be present, such as is now present in the nitrogen fixation or catalytic reactions where the iron oxide becomes dirty, or so called "poisoned" by constant use and must be changed or cleaned.

More specifically, as a preferred embodiment in carrying out my invention the iron oxide may be added at the top of the furnace or retorts together with the reducing agent, the proportions being preferably two-thirds iron ore and one-third reducing agent, although an excess amount of carbon in the reducing agent is not objectionable as the extra carbon may be returnable through the retorts as such after the reduction process. The reducing agent introduced with the iron ore may be wood waste, charcoal, peat, oil shale, or any hydrocarbon containing carbon and hydrogen which are given off as the predominating elements. The catalytic agent for forming the fixed methane may be in the form of a lining for the sides of the retorts, such as nickel or chromium, or may be combined with the iron ore and reducing agent and passed continuously through the retorts; in which case such catalyst may be nickel shot, particles of chromium or sponge iron taken from the bottom of the retorts, or any other similar catalyst. The iron ore and associated hydrocarbons will pass downwardly towards the reducing zone, and when the hydrocarbons pass the 500° F. zone, which is slightly below the outlets 9, and approach the breaking-up zone, which may be here stated as approximately 1000° F., the hydrocarbons containing C and H will be broken up in the presence of the catalysts and before the active reduction zone is reached. The carbon will pass on downwardly as a reducing agent, but the hydrogen will be released and will rise in the retorts. During this time carbon will be passing downwardly towards the reducing zone, and as the hydrogen rises and approaches the 500° F. zone, the hydrogen will combine with the carbon in the presence of the catalytic agent to form methane ($CH_4$), some of the hydrogen passing off with the methane through the outlets 9. It will be understood that the temperature of 500° F., at which the carbon and hydrogen will unite in the presence of a catalyst, may vary considerably, but such temperature of 500° F. has been found satisfactory and is here given as the preferred temperature. It may also be stated that the pressure maintained to assist this catalyzed reaction is approximately one pound.

The first reaction which is catalyzed in my process is the breaking up of hydrocarbons such as charcoal, peat, oil shale, etc., at a temperature higher than 500° F., and before the active reduction temperature is reached. I have found that this preferred temperature is approximately 1000° F., but I do not so limit myself. At this relatively low temperature the carbon and hydrogen will be separated in the presence of the catalyst, the hydrogen rising in the retort and the carbon continuing as a reducing agent, which function it will perform as it passes downwardly to the active reduction zone from 1300° F. to approximately 1900° F. The second reaction catalyzed is the binding of the hydrogen with carbon at approximately 500° F., and preferably at a slight pressure of approximately one pound.

In experimenting with the reduction of iron ore in a closed retort of this type, and in determining the gases obtained therefrom, I have found that without the use of a catalyzer that the resulting gas contains no appreciable methane ($CH_4$) content, or hydrogen content, but is very high in CO content with a B. t. u. value of approximately 300 per cubic foot. I have also found that by using a nickel catalyzer that the resulting gas obtained gave a ($CH_4$) methane content of over 5 per cent, as well as a high hydrogen content, while by using a catalyzer containing chromium, a gas having a $CH_4$ content of over 9 per cent was obtained, and also a higher hydrogen content. It will therefore be obvious that varying results may be obtained by the use of various catalyzers.

Having thus described my invention, what I claim is:

1. The method of producing a fixed gas of high methane content in the process of reducing iron ore, or similar metallic oxides, which consists in vertically enclosing and continuously feeding ore and a reducing agent containing carbon and hydrogen, establishing a reducing zone for the iron ore maintained at reducing but less than melting temperature for the ore and through which the ore is adapted to be passed, breaking up the reducing agent to separate the hydrogen and carbon before reaching the reducing zone, and subjecting the separated hydrogen and some of the carbon to a catalyst which catalyzes the formation of methane whereby to bind the same to form a fixed hydrocarbon gas, and removing said fixed gas at a point above the reducing zone.

2. The method of producing a gas of high methane content in the process of reducing iron ore and similar metallic oxides without melting, which consists in enclosing the ore and a reducing agent containing hydrogen and carbon, heating the same to a comparatively low temperature in the presence of a catalytic agent which catalyzes the breaking up of hydrocarbons to separate the hydrogen and carbon, and then subjecting the hydrogen and some of the carbon to a still lower temperature in the presence of a catalyst which catalyzes the formation of methane to bind the same to form a fixed gas.

3. The method of producing a fixed gas of high methane content in the process of reducing iron ore or similar metallic oxides, which consists in combining the iron ore with a reducing agent containing carbon and hydrogen, enclosing the same, heating the mixture by conduction by heat applied within the mass of ore and maintained at a temperature less than the melting point of the ore to separate the hydrogen and carbon, and subjecting the released hydrogen and some of the carbon to a catalyst which catalyzes the formation of methane whereby to bind elements of carbon and hydrogen to form a fixed gas.

4. In the process of reducing iron ore or similar metallic oxides, without melting, the method of producing a fixed gas of high methane content which consists in combining and enclosing the ore and a hydrocarbon, subjecting the ore and hydrocarbon to a temperature less than the active reducing temperature of the iron ore but sufficient to break up the hydrocarbon to release the hydrogen and carbon, and then subjecting the released hydrogen and some of the carbon to a lower temperature than that required for the separation and in the presence of a catalyst which catalyzes the formation of methane at a relatively low temperature whereby to bind the elements of hydrogen and carbon to form the fixed gas.

5. In the process of reducing iron ore, or similar metallic oxides, without melting, the method of producing a fixed gas of high methane content which consists in combining the iron ore and a hydrocarbon, enclosing and continuously feeding the ore and hydrocarbon through a preheating zone and toward an ore reducing zone in the presence of a catalyst, which catalyzes the breaking up of the hydrocarbon in the continuously feeding stream whereby to separate the carbon and hydrogen from their compounds before reaching the reducing zone maintained at a temperature sufficient to cause reduction of the ore by means of carbon without melting, and then binding the hydrogen with carbon at a lower temperature in the presence of a catalyst which catalyzes the formation of methane at said lower temperature.

6. In the process of reducing iron ore, or similar metallic oxides, without melting, the method of producing a fixed gas of high methane content which consists in combining the iron ore and a hydrocarbon, subjecting the ore and hydrocarbon to a temperature less than the active reducing temperature of the iron ore in the presence of a catalyst which catalyzes the breaking up of the hydrocarbons at said temperature whereby to disassociate the carbon and hydrogen, and then combining the separated hydrogen with carbon at a lower temperature than that required for the separation and in the presence of a catalyst which catalyzes the formation of methane at said lower temperature whereby to produce the fixed gas.

7. The method of producing a fixed gas of high methane content in the process of reducing iron ore, or similar metallic oxides, wherein the iron ore is subjected to a preheating and reducing zone to reduce the same to sponge iron without melting, which consists in enclosing and continuously feeding a charge of iron ore and a hydrocarbon reducing agent and, subjecting same to a relatively low breaking up heat to release the hydrogen from the reducing agent before being subjected to the higher temperatures of the reducing zone.

8. The method of producing a fixed gas of high methane content in the process of reducing iron ore, or similar metallic oxides, which consists in enclosing the ore and a hydrocarbon, subjecting said ore and hydrocarbon to a heat less than the active reducing heat in the presence of a continuously moving catalyst which catalyzes the breaking up of hydrocarbons whereby to separate the hydrogen and carbon, utilizing the carbon as a reducing agent for the ore and subjecting the hydrogen and carbon to a relatively low temperature in the presence of a catalyst which catalyzes the formation of methane whereby to bind the carbon and hydrogen to form the fixed gas.

9. The method of producing a fixed gas of high methane content in the process of reducing iron ore, or similar metallic oxides, which consists in enclosing the ore and a hydrocarbon, breaking up the hydrocarbon to release the hydrogen and subjecting the hydrogen in the presence of carbon to a relatively low temperature and a slight pressure in the presence of a continuously moving catalyst which catalyzes the formation of methane at relatively low temperatures whereby to bind the carbon and hydrogen to form the fixed gas.

10. The method of producing a fixed gas to high methane content in the process of reducing an iron ore or similar metallic oxides, which consists in establishing a reducing zone heated to a temperature sufficient to cause the reduction of the ore by means of carbon without melting, enclosing and gradually bringing up to the temperature of the reducing zone a continuously fed charge of iron ore and carbonaceous reducing agent together with a hydrogen bearing material, in the presence of a catalyst which catalyzes the formation of methane or similar hydrocarbons from the elements present in the charge.

In testimony whereof I affix my signature.

WILLIAM H. SMITH.